Jan. 24, 1939.  W. N. OLSON  2,144,994

EMULSIFIER

Filed May 25, 1936

Inventor:
Waldemar N. Olson.
By Brayton Richards
Attorney

Patented Jan. 24, 1939

2,144,994

UNITED STATES PATENT OFFICE 2,144,994

EMULSIFIER

Waldemar N. Olson, Brookfield, Ill., assignor to Reynolds Electric Company, Chicago, Ill., a corporation of Illinois Application May 25, 1936, Serial No. 81,695

5 Claims. (Cl. 99—267)

The invention relates to improvements in emulsifiers and has for its primary object the provision of an improved emulsifying apparatus of simple construction and highly efficient in use.

Another object of the invention is the provision of emulsifying apparatus so constructed and arranged as to prevent, normally and automatically, the clogging thereof during operation.

Other objects will appear hereinafter.

The invention consists in the combinations and arrangements of parts hereinafter described and claimed.

The invention will be best understood by reference to the accompanying drawing forming a part of this specification and in which—

Figure 1:
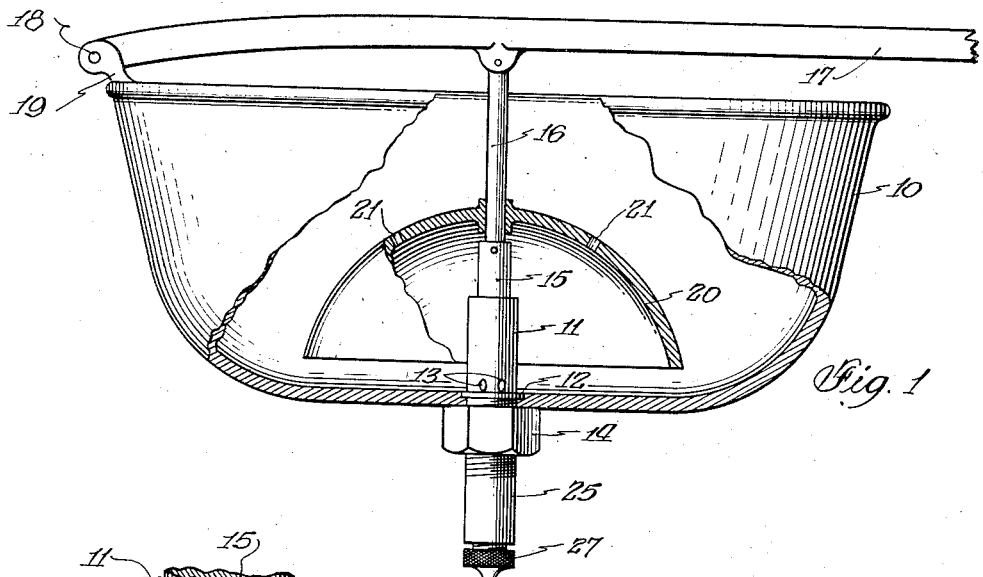
Figure 2:
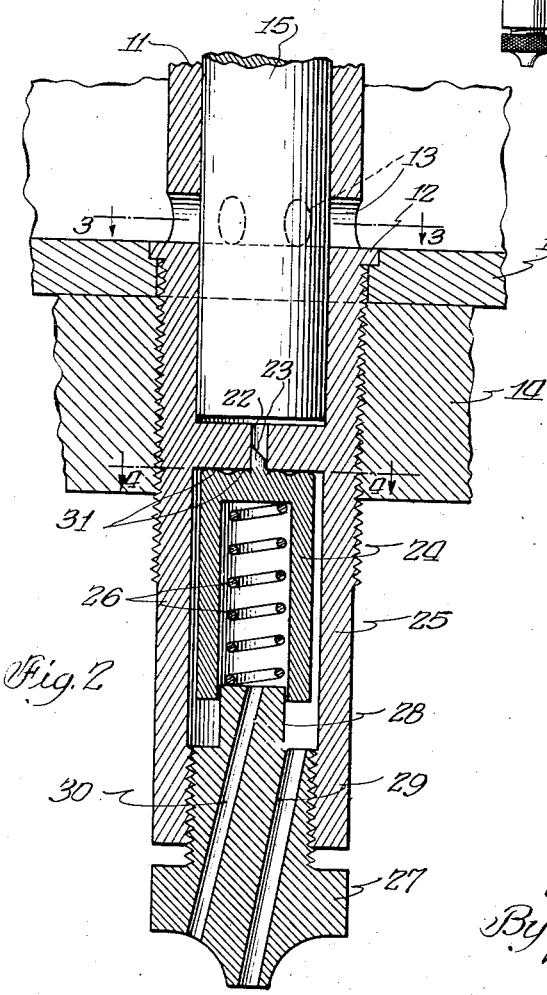
Figure 3:
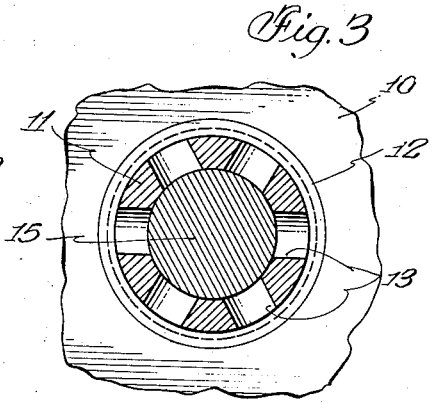

Fig. 1 is a side view, shown partially in section, of an emulsifying apparatus embodying the invention;

Fig. 2 an enlarged vertical section taken through the lower portion of a pressure chamber employed in the apparatus;

Fig. 3 a section taken substantially on line 3—3 of Fig. 2; and

Figure 4:
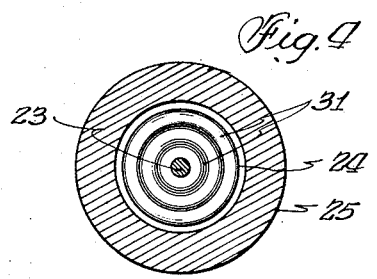

Fig. 4 a section taken substantially on line 4—4 of Fig. 2.

The embodiment of the invention illustrated in the drawing comprises a container 10 in the form of an open top bowl adapted and arranged to contain the liquid or material to be emulsified. A pressure chamber 11 is arranged as shown to project downwardly through a central opening in the bottom of the bowl, said pressure chamber being provided with a shoulder 12 seated in a recess flush with the bottom of the bowl as indicated. Entry ports 13 are provided in the pressure chamber 11 just above the shoulder 12, and said chamber is held in place by means of a locknut 14 threaded on the chamber 11 and seating against the bottom of the bowl 10. A reciprocating plunger or piston 15 is arranged to operate in the pressure chamber 11 being connected by a link 16 with an operating lever 17 pivoted at 18 on a bracket 19 at one edge of the bowl 10. An agitator 20 in the form of an inverted cup or bowl is attached to the link 16 and provided with air relief openings 21 as shown.

By this arrangement when the free end of the lever 17 is manipulated upwardly and downwardly by means of suitable driving mechanism (not shown) or by hand, the liquid or material to be emulsified in the bowl 10 will be drawn into the pressure chamber 11 through the ports 13 by the upward stroke of the plunger 15 and will be compressed in said pressure chamber by the downward stroke thereof, as will be readily understood.

The agitator 20 will serve to keep the material or liquid in the bowl 10 in a thoroughly agitated and uniformly mixed condition during such operation of the plunger 15.

A relatively small elongated escape passage 22 is arranged to pass centrally through the bottom of the pressure chamber 11 and is controlled by means of a control valve 23 having an inclined upper end as shown. The control valve 23 is carried by a housing 24 in the form of an inverted cup reciprocating freely in an extension 25 which loosely surrounds the same. A compression spring 26 is arranged in the housing 24 and a discharge nozzle 27 is threaded as shown in the lower end of the extension 25 and provided with a central plunger extension 28 fitting loosely into the lower end of the housing 24, thus serving to imprison the spring 26 and guide the lower end of said housing in its reciprocations in extension 25. A discharge passageway 29 extends through the nozzle 27 as shown, serving to discharge the emulsified liquid escaping from the chamber 11 into the extension 25, as will be readily understood. An air relief passage 30 extends from the housing 24 through the plunger 28 and nozzle 27 to prevent the creation of a partial vacuum in the housing 24 and thus permit free reciprocations of said housing. Two annular deflecting ridges 31 are provided on the top of the housing 24 surrounding the valve 23 as shown.

By this arrangement as the liquid or material drawn into the pressure chamber 11 is compressed therein by the action of the plunger 15, the valve 23 is depressed against the resistance of the spring 26 until the lower edge of the inclined top of the valve 23 passes beyond the corresponding lower edge of the escape passage 22, thereby causing a minute localized emulsifying escape opening or orifice at this point which permits the escape of the liquid or material under heavy pressure to cause the emulsification thereof in the usual way. Any solid or semi-solid particles in the liquid or material being emulsified and of sufficient consistency to clog or stop the escape opening will thereby cause a momentary and unusual increase in the pressure on the escaping liquid, thus momentarily depressing the valve 23 until the escape opening assumes sufficient size to permit the passage and escape of such clogging particle. The escape of the clogging particle will at once relieve the excessive and unusual pressure so that the valve 23 will at once return and assume its normal position and the emulsification process continued as before. The liquid or material escaping through the opening thus provided will impinge upon and be deflected by the sides of the ridges 31 against the bottom of the pressure chamber 11, thus tending to further agitate, mix and emulsify the same. By adjusting the nozzle 27 the tension of the spring 26 may be adjusted as desired, and the automatic operation of the valve 23 thus delicately adjusted to meet various conditions arising in normal operation of the apparatus. The specific form and arrangements of parts disclosed is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. An emulsifier comprising a container; a pressure chamber communicating therewith and having an elongated escape passage leading therefrom; a reciprocating plunger operating in said chamber to draw in material from said container and compress it in said chamber; and a yielding escape valve controlling said passage and having its end flattened and inclined and adapted and arranged to yield under the usual pressure in said chamber to provide a minute localized point-like emulsifying escape opening from said chamber and to yield further under unusual pressure in said chamber to enlarge said opening momentarily and to permit escape of opening clogging material.

2. An emulsifier comprising a container; a vertically arranged pressure chamber extending through the bottom of said container and provided in its sides with entry ports adjacent the bottom of the container, there being an elongated escape passage leading downwardly therefrom; a reciprocating plunger operating in said chamber to draw in material from said container and compress it in said chamber; and a downwardly yielding escape valve reciprocating in and controlling said passage and having its upper end flattened and inclined and adapted and arranged to yield under the usual pressure in said chamber to provide a minute localized point-like emulsifying escape opening from said chamber and to yield further under unusual pressure in said chamber to enlarge said opening momentarily and to permit escape of opening clogging material.

3. An emulsifier comprising a container; a vertically arranged pressure chamber extending through the bottom of said container and provided in its sides with entry ports adjacent the bottom of the container, there being an elongated escape passage leading downwardly therefrom; a reciprocating plunger operating in said chamber to draw in material from said container and compress it in said chamber; a downwardly yielding escape valve reciprocating in and controlling said passage and having its upper end flattened and inclined and adapted and arranged to yield under the usual pressure in said chamber to provide a minute localized point-like emulsifying escape opening from said chamber and to yield further under unusual pressure in said chamber to enlarge said opening momentarily and to permit escape of opening clogging material; and one or more deflecting surfaces surrounding said valve.

4. An emulsifier comprising a container; a vertically arranged pressure chamber extending through the bottom of said container and provided in its sides with entry ports adjacent the bottom of the container, there being an elongated escape passage leading downwardly therefrom; a reciprocating plunger operating in said chamber to draw in material from said container and compress it in said chamber; a downwardly yielding escape valve reciprocating in and controlling said passage and having its upper end inclined; an inverted-cup-like housing supporting said valve, there being a casing extension on the lower end of said chamber enclosing said housing; a compression spring in said housing; and an adjustable discharge nozzle threaded in the lower end of said extension and having a guide plunger sliding in the lower end of said housing to imprison said spring and guide the housing, there being a discharge passage leading from said extension through said nozzle and an air relief passage leading from said housing through said plug and nozzle.

5. An emulsifier comprising a container; a vertically arranged pressure chamber extending through the bottom of said container and provided in its sides with entry ports adjacent the bottom of the container, there being an elongated escape passage leading downwardly therefrom; a reciprocating plunger operating in said chamber to draw in material from said container and compress it in said chamber; a downwardly yielding escape valve reciprocating in and controlling said passage and having its upper end inclined; an inverted-cup-like housing supporting said valve, there being a casing extension on the lower end of said chamber enclosing said housing; one or more annular deflecting ridges on the top of said housing surrounding said valve; a compression spring in said housing; and an adjustable discharge nozzle threaded in the lower end of said extension and having a guide plunger sliding in the lower end of said housing to imprison said spring and guide the housing, there being a discharge passage leading from said extension through said nozzle and an air relief passage leading from said housing through said plug and nozzle.

WALDEMAR N. OLSON.